United States Patent [19]

Nelli

[11] 4,277,906
[45] Jul. 14, 1981

[54] FISH LINE GUIDE ASSEMBLY

[76] Inventor: Pierre Nelli, 146 Main St., Westport, Conn. 06880

[21] Appl. No.: 120,212

[22] Filed: Feb. 11, 1980

[51] Int. Cl.³ ............................................. A01K 87/04
[52] U.S. Cl. ......................................................... 43/24
[58] Field of Search ............................................. 43/24

[56] References Cited

U.S. PATENT DOCUMENTS

| 263,484 | 8/1882 | Chubb | 43/24 |
|---|---|---|---|
| 338,212 | 3/1886 | Whiting | 43/24 |
| 703,996 | 7/1902 | Cattley et al. | 43/24 |
| 1,781,569 | 11/1930 | Cook | 43/24 |
| 1,937,972 | 12/1933 | Madden | 43/24 |

FOREIGN PATENT DOCUMENTS

| 1169454 | 9/1958 | France | 43/24 |
|---|---|---|---|
| 39221 | 5/1965 | German Democratic Rep. | 43/24 |
| 13842 | 6/1912 | United Kingdom | 43/24 |
| 1132625 | 11/1968 | United Kingdom | 43/24 |

Primary Examiner—Jimmy C. Peters
Assistant Examiner—J. T. Zatarga
Attorney, Agent, or Firm—H. Gibner Lehmann; K. Gibner Lehmann

[57] ABSTRACT

A fish line guide assembly having a metal mounting clip with a body portion that is slitted and adapted to receive a slender tine of a removable wire loop member. The slender tine constitutes the base portion of the wire loop member, and has a non-circular or square cross section whereas the body portion of the clip has a passage of similar cross section, closely conforming to the tine. The loop member can be mounted on the clip or removed therefrom by inserting or withdrawing the tine from the passage of the mounting clip. The non-circular configuration of the tine and the closely-conforming slitted body portion of the clip coact to maintain the loop member in upright position with respect to the fishing rod, and to prevent undesired lateral shifting of the loop member thereon.

5 Claims, 7 Drawing Figures

FISH LINE GUIDE ASSEMBLY

BACKGROUND

This invention relates to fish line guide assemblages or attachments for fishing rods, and more particularly to a guide assemblage characterized by a metal mounting clip which is secured to the fishing rod and by a wire loop member which is demountably supported by said clip.

In the past a number of different fish line guide attachments have been proposed and produced, for guiding the fish line along the fish rod. Some of these attachments have been complicated, involving difficult or expensive-to-manufacture structure whereby there is an appreciable cost.

Other attachments have been directed toward the opposite extreme, that of simplicity so as to reduce the cost, but in these cases the attachment has had various drawbacks, such as snagging of the line, abrasion and wear, etc.

Where the attachments have not made provision for removal of the loop member, such member has of necessity involved relatively small loop portions in order to meet the demands for storage, handling, etc. when the fishing rod is not in use. Where the loop members have been made removable, the size of the loop portion could be increased without encountering difficulty in the dissembly and storage of the rod. However, the construction of such demountable-type attachments has given rise to difficulty as regards durability and ruggedness, as well as cost.

SUMMARY

The above disadvantages and drawbacks of prior fish line guide assemblies are obviated by the present invention, which has for one object the provision of a novel and improved line guide assembly which can be fabricated in an especially economical manner, utilizing only two component parts each of which is essentially simple and capable of inexpensive manufacture.

Another object of the invention is to provide an improved fish line guide assemblage as above set forth, which is sturdy and rugged in it construction whereby it is capable of withstanding normally hard usage without likelihood of failure.

A feature of the invention resides in the provision of an improved fish line guide assemblage as above set forth, which is particularly maintenance-free and not restricted as to the size of the loop portion thereof, and which can be produced by massproduction techniques so as to bring the cost to the lowest possible figure.

In accomplishing the above objects the invention provides a fish line guide assemblage having a metal mounting clip with an elongate body portion and attachment tabs which are integral with the body portion and extend in opposite directions from the ends thereof. The clip body portion is essentially tubular and has an elongate slit enabling it to spread apart laterally within limits. Cooperable with the mounting clip is a wire loop member which has a supporting base portion constituted of a single wire tine that is of square or non-circular cross section and adapted to be frictionally received in the body portion of the mounting clip. Such body portion defines a passage for receiving the single wire tine, which conforms closely to the non-circular or square cross section of the tine. The body portion is adapted to spread slightly and to frictionally grip the inserted tine whereby it holds the loop member against inadvertent removal and also against lateral movement while in its supporting passage.

Other features and advantages will hereinafter appear.

In the accompanying drawings, illustrating one embodiment of the invention:

Figure 1:
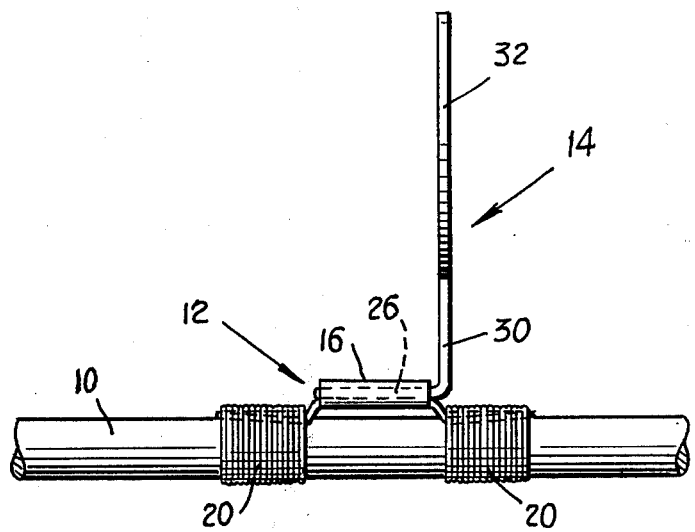
FIG. 1 is a side elevational view of the fish line guide assembly provided by the invention, mounted on a fishing rod and disposed in its operative position.

Referring to FIG. 1, the fishing rod is designated by the numeral 10. Secured to the rod 10 is a metal mounting clip indicated generally by the numeral 12, which demountably supports a wire loop member 14.

Figure 2:
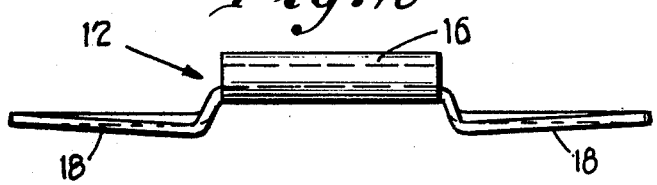
FIG. 2 is a side elevational view, enlarged, of the metal mounting clip.
Figure 3:
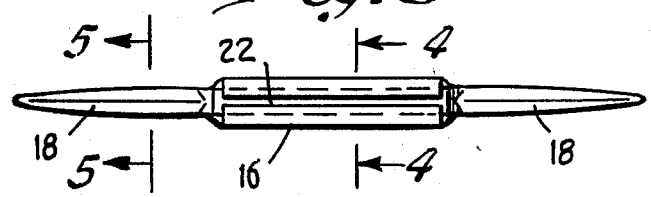
FIG. 3 is a top plan view of the metal mounting clip of the line guide assembly.

Referring to FIGS. 2 and 3, the metal mounting clip 12 is shown as being constituted of sheet metal, having an elongate body portion 16 and a pair of attachment tabs 18 which are offset as shown, being integral with the body portion 16 and extending in opposite directions from the ends thereof. The body portion 16 and tabs 18 are adapted for placement against the fish rod 10 with the tabs parallel to and overlying the rod for securement thereto by wrappings 20 as illustrated in FIG. 1.

As seen in FIG. 3, the clip body portion 16 is essentially tubular and has an elongate slit 22 which enables it to spread apart laterally within limits.

Cooperable with and supported by the mounting clip 12 is the wire loop member 14, such member being attachable to and demountable from the clip 12.

Figure 4:
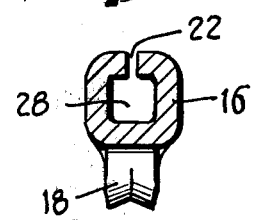
FIG. 4 is a transverse section through the mounting clip, taken on the line 4—4 of FIG. 3.

The wire loop member 14, in accordance with the present invention, has a supporting base portion 26 which is constituted as a single-wire tine that is of non-circular cross section, being shown in FIG. 4 as having a square cross section. The tine 26 is adapted to be frictionally received in the passage 28 of the mounting clip 12 and to be frictionally retained in said clip by virtue of the latter spreading laterally a slight extent when admitting the tine. A spring action occurs, by virtue of the resilience of the clip 12 whereby it firmly grips the tine 26 but still enables the loop member 14 to be removed when sufficient force is exerted upon the latter.

The loop member 14 has an offset portion 30 which is integral with the tine 26 and also integral with a circular wire loop portion 32 that is formed by bending the stock around a suitable mandrel. The end of the loop 32 is cut off diagonally, as illustrated at 34, so as to closely fit a bend 36 in the wire at the juncture of the loop 32 and the offset 30. The oblique end 34 is attached to the bend portion 36 either by brazing, or silver soldering, or else by a suitable welding procedure.

Figure 5:
FIG. 5 is a transverse section through the clip, taken on the line 5—5 of FIG. 3.
Figure 6:
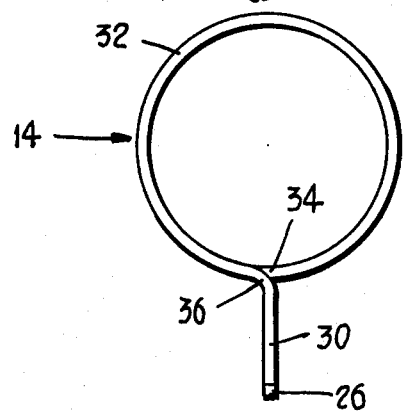
FIG. 6 is a front elevational view of the wire loop member of the fish line guide assembly.
Figure 7:
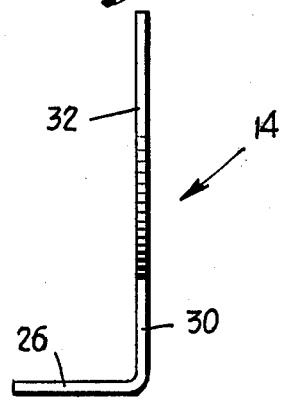
FIG. 7 is a side elevational view of the wire loop member.

As seen in FIG. 5, the tabs 18 have a slightly angular cross section whereby they are adapted for easy fitting to fish rods of various diameters and cross sectional configurations.

As provided by the invention, the loop member 14 can be advantageously formed of metal wire, such as stainless steel, which has a square cross section, thereby providing the desired cross sectional configuration to the tine 26.

The close conformity between the passage 28 of the mounting clip and cross section of the tine 26 securely holds the loop member in the desired position and also prevents any angular or lateral shifting of the same. Yet, due to the resilience of the clip body 16 of the loop member can be slipped off when desired, for dismantling and storage of the fishing rod.

It will now be seen from the foregoing that I have provided a novel and improved fish line guide assembly which is essentially simple in its construction while at the same time being sturdy and rugged, and capable of economical manufacture whereby the component parts may be readily mass-produced at low cost, so that the entire unit can be attractively priced. Variations and modifications are possible without departing from the spirit of the invention.

What is claimed is:

1. A fish-line guide assembly having a removable wire loop member, said assembly being adapted for attachment to a fish rod to confine and guide the fish line along the same and comprising in combination:
   (a) a metal mounting clip having an elongate body portion and a pair of attachment tabs integral with the body portion and extending in opposite directions from the ends thereof, said tabs being adapted for placement against the fish rod with the tabs parallel to and overlying the rod for securement thereto by wrappings,
   (b) said clip body portion being resilient, essentially tubular, having a cross-sectional configuration adapted to closely confine a single thickness, rod-like member, and having a slit extending between its ends, enabling it to spread apart laterally within limits,
   (c) a one-piece wire loop member having an integral supporting rod-like base constituted of a solid, single-thickness wire tine which is of non-circular cross section and is adapted to be frictionally received in the body portion of the mounting clip,
   (d) said body portion defining a passage for receiving the single-thickness wire tine of the loop member and at said passage conforming to the non-circular cross section of said tine,
   (e) said body portion being adapted to spread slightly and to frictionally grip the inserted tine of the loop member, thereby to hold the loop member against inadvertent removal and also against lateral movement while in its supported position.

2. A fish line guide assembly as set forth in claim 1, wherein:
   (a) the single wire tine has a polygonal cross section characterized by sharp corners.

3. A fish line guide assembly as set forth in claim 1, wherein:
   (a) the single wire tine is of square cross section.

4. A fish line guide assembly as set forth in claim 1, wherein:
   (a) the wire loop member is constituted of a single piece of metal wire having a loop portion formed by bending the wire in a circle and joining one end portion of the wire to an intermediate portion thereof.

5. A fish line guide assembly as set forth in claim 4, wherein:
   (a) the single piece of wire is of square cross section.

* * * * *